US012748627B2

(12) United States Patent
Kharb et al.

(10) Patent No.: US 12,748,627 B2
(45) **Date of Patent: *Sep. 29, 2026**

(54) ARTIFICIAL-INTELLIGENCE-AUGMENTED PROVISIONING OF COMPUTING RESOURCES

(71) Applicant: WORKDAY, INC., Pleasanton, CA (US)

(72) Inventors: Amit Kharb, Leixlip County Kildare (IE); Patrick D. Kirby, Livermore, CA (US); Don Rudish, Mountain House, CA (US); Charu Gupta, Fremont, CA (US); David Wong, Dublin, CA (US)

(73) Assignee: WORKDAY, INC., Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/408,865

(22) Filed: Dec. 4, 2025

(65) Prior Publication Data

US 2026/0086866 A1 Mar. 26, 2026

Related U.S. Application Data

(63) Continuation of application No. 18/813,277, filed on Aug. 23, 2024.

(51) Int. Cl.
*G06F 9/50* (2006.01)

(52) U.S. Cl.
CPC .................................. *G06F 9/5027* (2013.01)

(58) Field of Classification Search
CPC ..................................................... G06F 9/5027
See application file for complete search history.

(56) References Cited

U.S. PATENT DOCUMENTS

2022/0121633 A1* 4/2022 Quader ................. G06F 16/213

OTHER PUBLICATIONS

Extended European Search Report to corresponding EP Appln. No. 25197382.2, mailed Dec. 23, 2025 (14 pages).
Verma et al., "Dynamic resource demand prediction and allocation in multi-tenant service clouds," Concurrency and Computaton: Practice and Experience, 28:4429-4442 (2016).

* cited by examiner

*Primary Examiner* — Wissam Rashid
(74) *Attorney, Agent, or Firm* — James J. DeCarlo; Greenberg Traurig, LLP

(57) ABSTRACT

A disclosed computer-implemented method may include providing, by a processor, an artificial intelligence model ("predictive model") pre-configured to infer, via a plurality of features included in the predictive model trained using data representative of computing resource requirements of current tenants of a multitenant computing platform, computing resource requirements for potential tenants of the multitenant computing platform. The method may also include receiving, by the processor, at least one query comprising data that describes an attribute of a potential tenant of the multitenant computing platform, and determining, by the processor, based on an inference of the predictive model generated based on the at least one query, an output comprising an estimated computing resource requirement of the potential tenant. Various other methods, systems, and computer-readable media are also disclosed.

20 Claims, 6 Drawing Sheets

600

ARTIFICIAL-INTELLIGENCE-AUGMENTED PROVISIONING OF COMPUTING RESOURCES

CROSS-REFERENCE TO RELATED APPLICATION

This application claims the benefit of priority from, and is a continuation of U.S. application Ser. No. 18/813,277, filed Aug. 23, 2024, which is incorporated herein by reference in its entirety.

BACKGROUND

Artificial Intelligence (AI) models (predictive models) are a class of machine learning algorithms that can predict a series of outputs given an input series of data. predictive models are frequently used in various fields, including natural language processing, image recognition, and other complex tasks to generate predictions or decisions in response to specific inputs. General-purpose models are trained on large datasets, which adjusts the weights within the model and influences the accuracy of the predictive model's output. Specialized predictive models, on the other hand, are designed and trained for specific tasks or domains. These models, tailored to a certain type of data or problem, often use training datasets that are particularly relevant to the task at hand. This specific focus allows specialized models to achieve higher accuracy and performance in their designated areas compared to general-purpose models. Nonetheless, they may not generalize well to tasks outside their specific domain.

DETAILED DESCRIPTION

Figure 1:
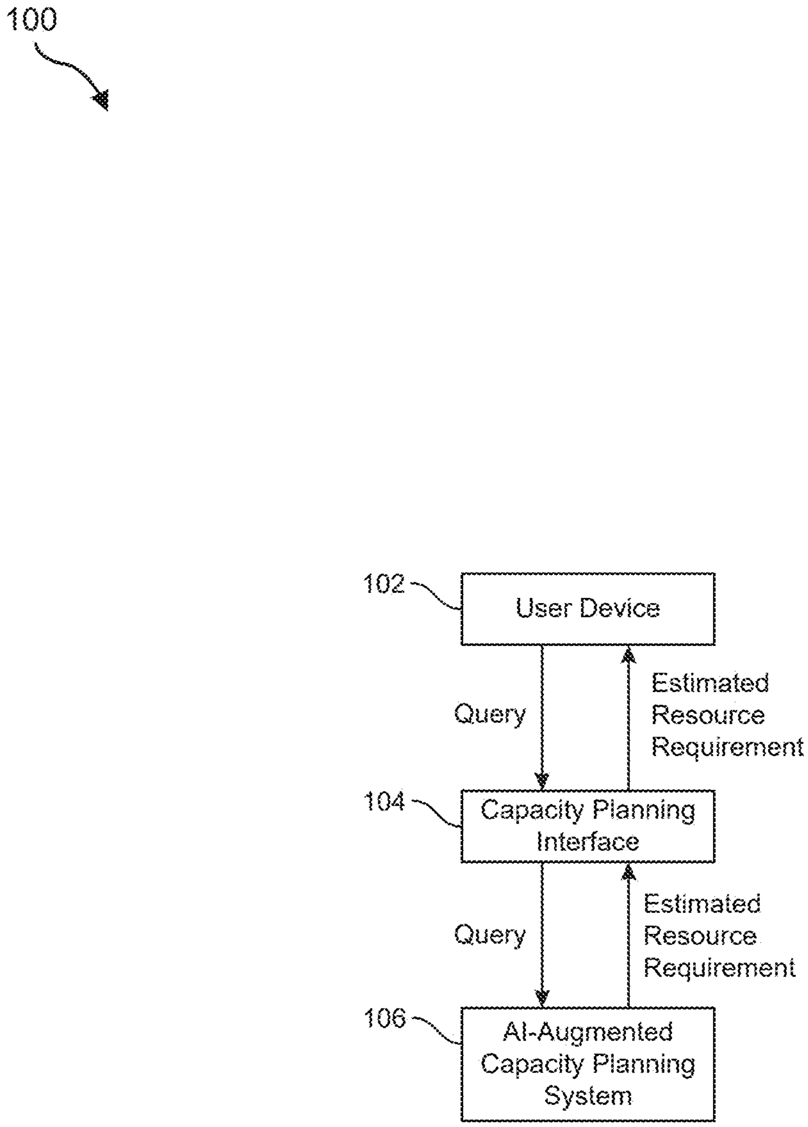
FIG. 1 is a block diagram illustrating an artificial-intelligence-augmented (AI-augmented) capacity planning system according to some of the disclosed embodiments.

In cloud-based services (e.g., cloud applications and/or multitenant computing systems), a significant challenge can be capacity planning for cloud services tenants. As cloud computing services onboard new tenants or users and introduce new cloud services to existing users, administrators must effectively plan capacity to meet the increasing demand. This may be of special concern for large enterprise tenants who may have a significant amount of data and/or high transaction volumes.

Capacity planning, which involves determining the computing resources (e.g., processing resources, storage resources, networking resources, etc.) needed to meet future workload demands, presents significant technical challenges. This critical task directly impacts the operational efficiency of the cloud service. The process requires accurate prediction and balancing of resource allocation to prevent issues related to system performance. If not properly managed, insufficient capacity can lead to technical problems like system overloads, slower processing times, and overall poor performance, resulting in user dissatisfaction. Conversely, overestimation can lead to excess capacity, resulting in underutilized resources, unnecessary energy consumption, and increased costs, which are detrimental to system efficiency and sustainability. Thus, a technical problem lies in developing an effective method for capacity planning that can precisely predict and allocate the necessary computing resources to meet future workload demands while maintaining system efficiency.

Traditional methods of capacity planning often prove to be laborious, ineffective, time-consuming, and expensive. They typically involve manually comparing similar tenants, predicting capacity requirements based on these comparisons, running performance tests to validate the predictions, and adjusting the capacity planning numbers based on the test results. This process can take significant time, particularly for large-scale enterprise tenants, making it impractical for every new tenant or each subsequent tenant to undergo a traditional capacity planning process.

Moreover, the existing methods of capacity planning often fail to include all necessary considerations, resulting in incomplete and inaccurate planning. This lack of planning or poor planning can lead to avoidable internal escalations to address and resolve capacity issues, further straining resources and negatively impacting the user experience.

Given these challenges, it has been recognized in this disclosure that there is a pressing need for improved systems and methods for provisioning of computing resources that can streamline and automate the capacity planning process, making it more accurate, efficient, and cost-effective.

The disclosed embodiments relate to the use of artificial intelligence models ("predictive models") for artificial-intelligence-augmented ("AI-augmented") capacity planning within shared computing platforms. The disclosed embodiments describe techniques for executing AI-augmented capacity planning and/or provisioning tasks within the context of cloud-based services.

In some implementations, the disclosure relates to a method including: receiving, by a processor, at least one query including data that describes a potential tenant of a multitenant computing platform, the data including at least a number of anticipated end users of computing resources of the potential tenant; generating, by the processor, an input vector based on the at least one query; inputting, by the processor, the input vector into a predictive model, the predictive model trained using data representative of computing resource requirements of current tenants of a multitenant computing platform, the predictive model generating, based on the input vector, an output representing an estimated computing resource requirement of the potential tenant; and generating, by the processor, based on the output, a change to resources managed by the multitenant computing platform.

In some implementations, the disclosure relates to a method, further including implementing, by the processor, the predictive model as a gradient boost classifier.

In some implementations, the disclosure relates to a method, further including generating, by the processor, the change to resources managed by the multitenant computing platform by provisioning computing resources of the multitenant computing platform to the potential tenant based on the output.

In some implementations, the disclosure relates to a method, further including generating, by the processor, the change to resources managed by the multitenant computing platform by automatically provisioning computing resources of the multitenant computing platform to the potential tenant in response to the output.

In some implementations, the disclosure relates to a method, further including generating, by the processor, the change to resources managed by the multitenant computing platform by provisioning computing resources of the multitenant computing platform to the potential tenant based on the output via at least one of: a private instance of the multitenant computing platform; or a shared instance of the multitenant computing platform.

In some implementations, the disclosure relates to a method, further including training, by the processor, the predictive model by analyzing a set of input data representative of current computing resource allotments of current users of the multitenant computing platform.

In some implementations, the disclosure relates to a method, further including training, by the processor, the predictive model by directing the predictive model to analyze, in accordance with a training methodology of the predictive model, a set of input data associated with current tenants of the multitenant computing platform, the set of input data including, for each current tenant in a set of current tenants, a current computing resource allotment and at least one of: a total end user amount associated with the current tenant; an active end user amount associated with the current tenant; an independent end user amount associated with the current tenant; or a terminated end user amount associated with the current tenant.

In some implementations, the disclosure relates to a method, further including training, by the processor, the predictive model by directing the predictive model to analyze, in accordance with a training methodology of the predictive model, a set of training data associated with current tenants of the multitenant computing platform, the set of training data including, for each current tenant in a set of current tenants, a current computing resource allotment and at least one of: an age of the current tenant; and at least one duration of at least one task initiated by the tenant and executed using computing resources of the multitenant computing platform.

In some implementations, the disclosure relates to a method, further including re-training, by the processor, the predictive model using the at least one query and the output.

In some implementations, the disclosure relates to a method, further including: exposing, by the processor, an application programming interface that is configured to receive queries for the predictive model; and receiving, by the processor via the application programming interface, the at least one query associated with the potential tenant of the multitenant computing platform.

In some implementations, the disclosure relates to a method, further including determining, by the processor, based on the output of the predictive model generated based on the input vector, the estimated computing resource requirement of the potential tenant, the estimated computing resource requirement including a data storage requirement.

In some implementations, the disclosure relates to a method, further including: inputting, by the processor, the input vector into at least one additional predictive model, the at least one additional predictive model generating at least one additional output; and aggregating the output of the predictive model with the at least one additional output to produce an aggregated output, the aggregated output representing the estimated computing resource requirement of the potential tenant.

In some implementations, the disclosure relates to a method, further including training the at least one additional predictive model using different data than the data representative of computing resource requirements of current tenants of the multitenant computing platform used to train the predictive model.

In some implementations, the disclosure relates to a method, further including presenting the output via a user interface configured to enable users to view outputs and provide inputs for tenant computing capacity planning.

In some implementations, the disclosure relates to a method, further including validating by the processor, the at least one query prior to generating, by the processor, the input vector based on the at least one query.

In some implementations, the disclosure relates to a method including: collecting, by a processor, a data set associated with a set of current tenants of a multitenant computing platform, the data set including, for each current tenant included in the set of current tenants, a computing resource allocation associated with the current tenant; training, based on the data set, a predictive model to generate, based on at least one input vector, computing requirements for potential tenants of the multitenant computing platform, the training including: cleaning the data set; transforming the data set into a format analyzable by the predictive model; analyzing the data set in accordance with a training methodology of the predictive model; and configuring the predictive model by adjusting one or more parameters included in the predictive model.

In some implementations, the disclosure relates to a method, further including implementing, by the processor, the predictive model as a gradient boost classifier.

In some implementations, the disclosure relates to a method, further including collecting, by a processor, the data set, the data set further including, for each current tenant included in the set of current tenants, a current resource usage of the current tenant including at least one of: an age of the current tenant; and at least one duration of at least one task executed by the tenant using computing resources of the multitenant computing platform.

In some implementations, the disclosure relates to a method, further including tuning the predictive model by adjusting at least one hyperparameter of the predictive model, the at least one hyperparameter selected from a set of hyperparameters including: a maximum depth of layers of the predictive model; and a maximum number of features of the predictive model.

In some implementations, the disclosure relates to a method including: receiving, by a processor, a query including data that describes a potential tenant of a multitenant computing platform; querying, by the processor, using the query, a plurality of predictive models to generate a plurality of outputs, each predictive model in the plurality of predictive models trained using a different data set associated with current tenants of the multitenant computing platform; aggregating, by the processor, the plurality of outputs into an aggregated output; and determining, by the processor, based on the aggregated output, an estimated computing resource requirement of the potential tenant by consolidating the plurality of outputs into a consolidated query result.

In the following detailed description, numerous specific details are set forth in order to provide a thorough understanding of the disclosed subject matter. However, it will be understood by those of ordinary skill in the art that the disclosed subject matter may be practiced without these specific details. In other instances, well-known methods, procedures, components, and circuits have not been described in detail so as not to obscure the disclosure.

While the disclosure will be described with reference to various embodiments, it will be understood that these embodiments are not intended to limit the scope of the disclosure. On the contrary, the disclosure is intended to cover alternatives, modifications, and equivalents, which may be included within the spirit and scope of the disclosure as defined by the appended claims. The following detailed description, therefore, is not to be taken in a limiting sense, and the scope of the present disclosure is defined by the appended claims and their equivalents.

Various operations are described as multiple discrete steps to aid in understanding the disclosure. However, the order of description should not imply that these operations are necessarily dependent on sequence. In particular, these operations need not be performed in the order presented.

The present disclosure will now be described more fully hereinafter with reference to the accompanying figures, in which embodiments of the disclosure are shown. The disclosed subject matter may, however, be embodied in many different forms and should not be construed as limited to the embodiments set forth herein. Rather, these embodiments are provided so that this disclosure will be thorough and complete, and will fully convey the scope of the disclosed subject matter to those skilled in the art.

FIG. 1 is a block diagram illustrating an example system 100 according to some of the disclosed embodiments. As depicted, the example system 100 includes a user device 102, a capacity planning interface 104, and an AI-augmented capacity planning system 106.

In the illustrated system, user device 102 may include a computing device communicatively coupled to the capacity planning interface 104. Examples of such devices could include, but are not limited to, a personal computer, a laptop, a tablet, or a mobile phone. User device 102 can be any computing device (such as that depicted in FIG. 5) that can interact with the capacity planning interface and the AI-augmented capacity planning system. In some examples, a capacity planning system can be provided to assist administrators in forecasting, selecting, allocating, and/or managing computing resources for cloud services tenants. This often occurs via a process of assessing current resource usage, predicting future demand, and adjusting resource allocation accordingly. This process is used to ensure the enterprise delivers optimal system performance, when aspects such as processing power, storage space, network capacity, and time are considered. In the context of this disclosure, "capacity planning" is further enhanced by artificial intelligence to streamline and optimize these processes.

As represented in FIG. 1, user device 102 can submit at least one query to the capacity planning interface 104. This query comprises data that describes an attribute of a potential tenant of a multitenant computing platform, and may additionally or alternatively represent a capacity planning task or a set of tasks that the user aims to achieve using the AI-augmented capacity planning system 106. The capacity planning interface 104 receives these queries and communicates them to the AI-augmented capacity planning system 106.

In the depicted system, the AI-augmented capacity planning system 106 is linked to the capacity planning interface 104 to receive the queries. The AI-augmented capacity planning system 106, equipped with a pre-configured predictive model, determines an estimated computing resource requirement for the potential tenant based on the received query. This predictive model has been trained using data representative of computing resource requirements of current tenants of the multitenant computing platform, enabling it to infer the computing resource requirements for potential tenants.

As shown, the capacity planning interface 104 then transmits the determined estimated computing resource requirement back to the user device 102. The capacity planning interface 104 operates as an intermediary, conveying the estimated computing resource requirement generated by the AI-augmented capacity planning system 106 to the user at user device 102. This estimation guides the user in their capacity planning tasks, offering optimized actions and decisions based on the query submitted.

In certain implementations, the capacity planning interface 104 may also receive and present feedback from the AI-augmented capacity planning system 106, such as confirmation of tasks completed, error messages, or the outcomes of executed queries or tasks. This feedback mechanism allows the user to verify the success of the estimated computing resource requirement and, if necessary, modify their approach based on the feedback received. Additionally or alternatively, in some implementations, the AI-augmented capacity planning system may perform additional or alternative tasks associated with capacity planning, such as provisioning of computing resources, configuring and/or reconfiguring of the predictive model, and so forth. Further details of the system 100 are described in connection with the following figures and those details are incorporated herein.

In some instances, an "Artificial Intelligence model" or "predictive model" refers to a computational framework designed to perform tasks traditionally requiring human intelligence. These tasks include but are not limited to learning from data, recognizing patterns, making decisions, and predicting outcomes. The predictive model learns from historical data to make predictions or decisions without being explicitly programmed to perform the task. In the context of this disclosure, a predictive model, such as a regression, classification, or ensemble model, may be used to automate the capacity planning process, learn from existing fleet data, and generate accurate predictions for new tenant deployments, subsequent tenant deployments, and/or large enterprise onboardings to a multitenant computing platform.

Furthermore, in certain examples, a "machine learning model" can be understood as a specific type of predictive model that improves its performance over time by learning from data. These models are capable of learning patterns in data and then making predictions or decisions based on those patterns. Machine learning models can be trained to perform specific tasks, such as regression or classification, and their performance improves as they are exposed to more data. For the purposes of this disclosure, machine learning models, including but not limited to supervised and unsupervised models, are used to learn from various features related to tenant capacity planning, such as active employees, contingent workers, terminated workers, and users of a prospective tenant, and accurately predict computing resource usage for the prospective tenant.

Figure 2:
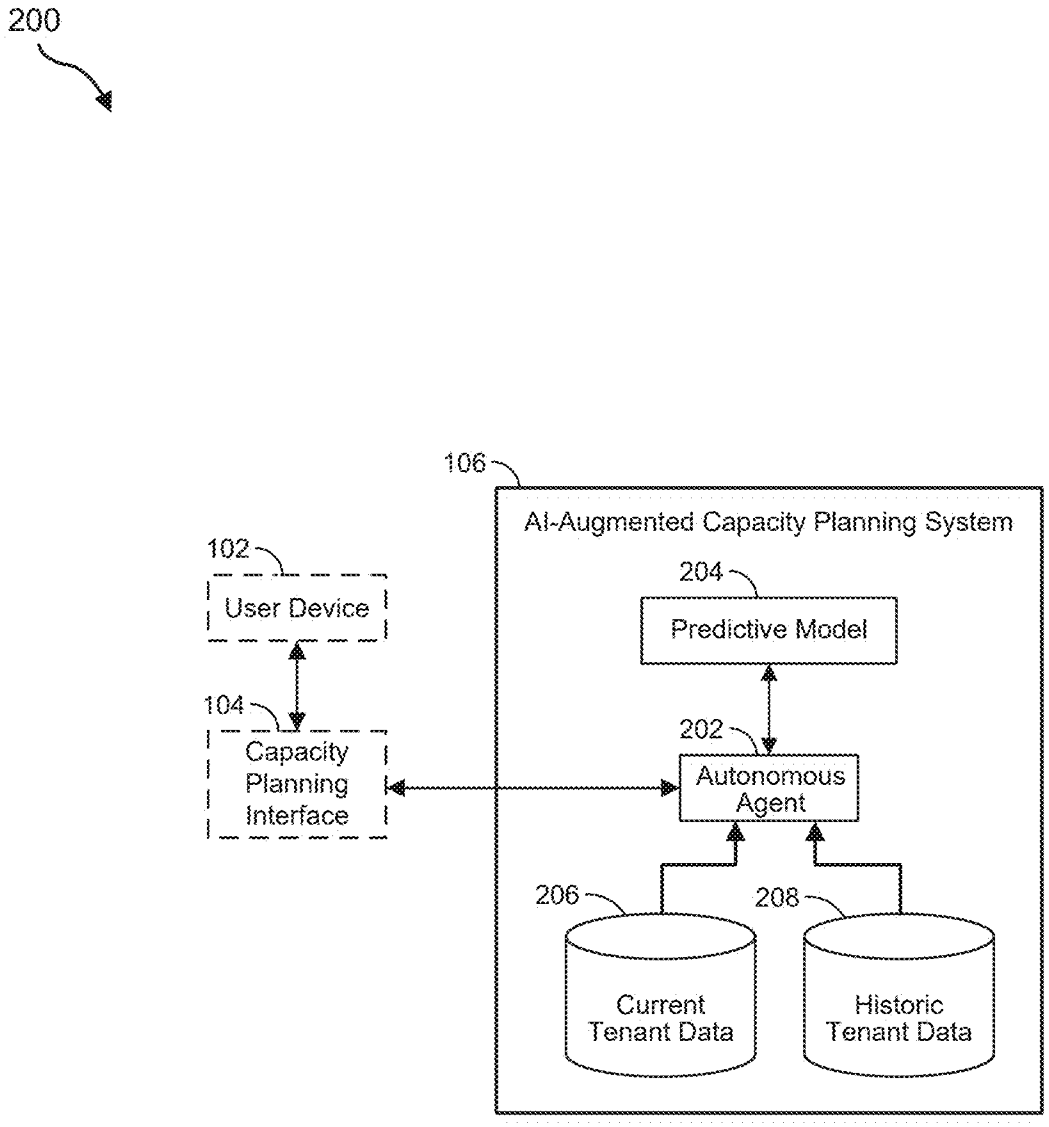
FIG. 2 is a block diagram illustrating an additional AI-augmented capacity planning system according to some of the disclosed embodiments.

FIG. 2 is a block diagram illustrating an AI-augmented capacity planning system (e.g., AI-augmented capacity planning system 106) according to some of the disclosed embodiments.

As illustrated, the AI-augmented capacity planning system 106 includes an autonomous agent 202, a predictive model 204, current tenant data 206, and historic tenant data 208. The autonomous agent 202 is communicatively coupled to the predictive model 204, which serves as the predictive model for processing and generating capacity planning predictions. The predictive model 204 may be capable of analyzing and learning from vast amounts of data, including aggregate tenant capacity and/or usage data and tenant-specific capacity and/or usage information. The autonomous agent 202 is also connected to the current tenant data 206, which provides the immediate context for tenant resource utilization, ensuring that generated predictions are accurate and relevant. Additionally, the autonomous agent 202 has access to historic tenant data 208, which includes data on past tenant behavior, resource usage, and system performance. This historical data helps inform the generation of estimated resource requirements by providing context and learning from previous tenant usage of computing resources.

In some implementations, the predictive model 204 may be part of the AI-augmented capacity planning system 106. In other implementations, the predictive model 204 may include or comprise a third-party (e.g., network-connected) predictive model. As discussed above in reference to FIG. 1, the AI-augmented capacity planning system 106 may receive input data from user device 102 via autonomous agent 202. The autonomous agent 202 can generate responses to transmit to user device 102 for presentation via the capacity planning interface 104.

The autonomous agent 202, as depicted in FIG. 2, functions as the core processor within the AI-augmented capacity planning system 106. This agent, a self-contained software program capable of performing tasks autonomously, interfaces between the user device 102 and the AI-augmented capacity planning system 106 through the capacity planning interface 104. Additionally or alternatively, the autonomous agent 202 may perform further operations such as provisioning of computing resources within the multitenant computing platform and/or training or re-training one or more predictive models.

In computer programming, an "agent" can be simple or complex, designed to automate repetitive tasks or adapt to new inputs and situations using AI algorithms. They can operate independently or interact with other agents in multi-agent systems.

In the context of the AI-augmented capacity planning system 106, autonomous agent 202 receives input data (i.e., queries) from the user device 102, interprets this data with the aid of a predictive model 204, current tenant data 206, and historic tenant data 208, and generates corresponding capacity planning such as, but not limited to, estimated resource requirements of a prospective tenant of a multi-tenant computing platform. The predictive model 204 enables the agent to learn from data and formulate optimized capacity planning outcomes, while the historic tenant data 208 provides past experiences to inform the decision-making process.

The predictive model 204 refines the understanding of the data by leveraging advanced machine learning capabilities to understand the patterns of tenant resource usage, decipher the needs behind the data, and produce contextually relevant capacity planning predictions.

Machine learning, as used herein, may be a set of procedures or rules used by a predictive model to find patterns in data and learn from them. These algorithms can be used to train a model on a dataset, enabling the model to make accurate predictions or decisions without human intervention. In some examples described herein, predictive algorithms can be used to optimize tenant capacity planning by learning from past or existing tenant data and making resource allocation recommendations.

The inventors recognized that traditional methods for capacity planning, such as manual estimation, were inadequate for accurately predicting resource needs. In contrast, machine learning approaches, which can consider a multitude of features that impact resource requirements, were identified as a better fit for this problem.

As an example of the problem at hand, consider a new customer that requires the allocation of resources across various servers. The goal is to predict the same allocation using machine learning, without the need for running performance tests in the tenant's environment.

Initial attempts to solve this problem involved using linear regression and multiple variable regression algorithms, with features such as employee count, product area, and industry. however, these attempts provided no correlation, indicating that the chosen features were not sufficient for predicting the resource requirements.

Further investigation revealed that some of the employee count data was not up-to-date. The solution was to replace employee count with more accurate metrics: "active employees", "contingent workers", "terminated workers", and "cloud system users", obtained from usage metrics data.

With these updated features, the use of decision tree regression and ensemble machine learning algorithms such as random forest regression and gradient boost regression yielded an accuracy of around 70% in predicting tenant resource usage and/or allocations.

Considering the possible values of tenant resource usage and/or allocation sizes for current tenants in both public and private clouds, the inventors reframed the problem as a classification problem. Using machine learning classification algorithms improved the accuracy of the predictions to approximately 80%.

Upon analyzing the instances where predictions were incorrect, the inventors found that additional features could further improve the accuracy. For example, the resource usage for certain tenants was dependent not only on the current features but also on the number of companies. By incorporating additional features such as the number of companies, the number of transactions, and the age of the tenant, the accuracy increased to above 90%.

The inventors evaluated several classification algorithms for their accuracy in predicting resource usage and/or allocations, and the gradient boost classifier emerged as the most effective, particularly for predicting both smaller and larger size tenants.

The hyperparameters of the chosen gradient boost classifier algorithm were then fine-tuned to further increase the accuracy without overfitting. The "max_depth" parameter was increased from the default value of 3 to 15, and the "max features" parameter was set to 0.7 to prevent overfitting.

A helpful aspect of the inventor's evaluations of different machine learning methodologies involved employing constant validation to avoid overfitting, which can lead to poor real-world prediction performance despite high accuracy on test data. This was achieved by regularly running cross-validation.

The above investigation highlighted the importance of trying different algorithms and feature sets, observing test results to identify new features that can increase accuracy, running cross-validation to prevent overfitting, and tuning hyperparameters to balance accuracy and overfitting.

As a result of these iterative improvements, the accuracy score for predicting resource requirements and/or allocations (e.g., tenant memory size) rose from approximately 45% to over 90%. The final algorithm, a gradient boost classifier, demonstrated confidence in its predictions, providing a robust solution to the problem of capacity planning.

Hence, in some examples, predictive model 204 may include, without limitation, one or more of the following: a linear regression model, a multiple variable regression model, a decision tree regression model, a random forest regression model, a gradient boost regression model, a gradient boost classifier, and so forth.

Furthermore, in some examples, predictive model 204 may include a generative machine learning model. In some examples, a "generative machine learning model" or can be a type of machine learning model that is capable of generating new data instances that resemble the training data. These models can learn the true data distribution of the training set so as to generate new data points with some variations. In the context of this disclosure, a generative machine learning model may be used to create new capacity planning strategies based on patterns learned from historical tenant data.

Moreover, in some examples, predictive model 204 may include a natural language model. A "natural language model" can be understood as a type of artificial intelligence model that is designed to understand, interpret, generate, and respond to human language in a way that is both grammatically and contextually appropriate. These models may be used to facilitate human-computer interaction, allowing computers to understand instructions and queries in natural language form. Hence, a "natural language query" may be a search or command expressed in everyday language. It may include or represent a type of query in which the user interacts with the system using full sentences, phrases, or questions, as opposed to keywords or specific codes. In some embodiments, a query received by AI-augmented capacity planning system 106 may include a natural language query. Hence, a natural language query may be used in the capacity planning interface to request estimated resource requirements for prospective tenants.

Likewise, in some examples, predictive model 204 may include a large language model. A "large language model" or "LLM" can be understood as a specific type of generative machine learning model that has been trained on a vast amount of text data. Due to its extensive training, an LLM is capable of generating text that is grammatically correct and contextually coherent. These models have the ability to understand, interpret, generate, and respond to human language in a sophisticated and nuanced manner. In the context of this disclosure, an LLM may be used to streamline and optimize resource planning tasks by processing natural language queries in the capacity planning interface, understanding the intricacies of the organizational capacity planning policy, and generating novel capacity planning strategies based on patterns learned from current and/or historical tenant data.

Current tenant data (e.g., current tenant data 206) can include records of current resource allocations of current tenants, current attributes of the current tenants (e.g., employee numbers, software used, age or duration of the tenant and/or service, etc.). Historic tenant data (e.g., historic tenant data 208) can include records of previous resource allocations, system performance data, user activity logs, and other relevant tenant capacity information. This information aids the autonomous agent 202 in making data-driven decisions and in identifying patterns or best practices that can be applied to prospective tenant capacity challenges.

The final output of this collaboration is a set of capacity planning predictions, that may include an estimated resource requirement for a prospective tenant of the multitenant computing platform that the autonomous agent 202 may then communicate to the capacity planning interface 104. The capacity planning interface 104 may then present these predictions to the user via user device 102, assisting them in making informed capacity planning decisions. The AI-augmented capacity planning system 106, through the integration of the autonomous agent 202, the predictive model 204, the current tenant data 206, and the historic tenant data 208, transforms complex tenant requirements into clear estimations of resource requirements, streamlining the capacity planning process and enhancing decision-making efficiency.

Figure 3:
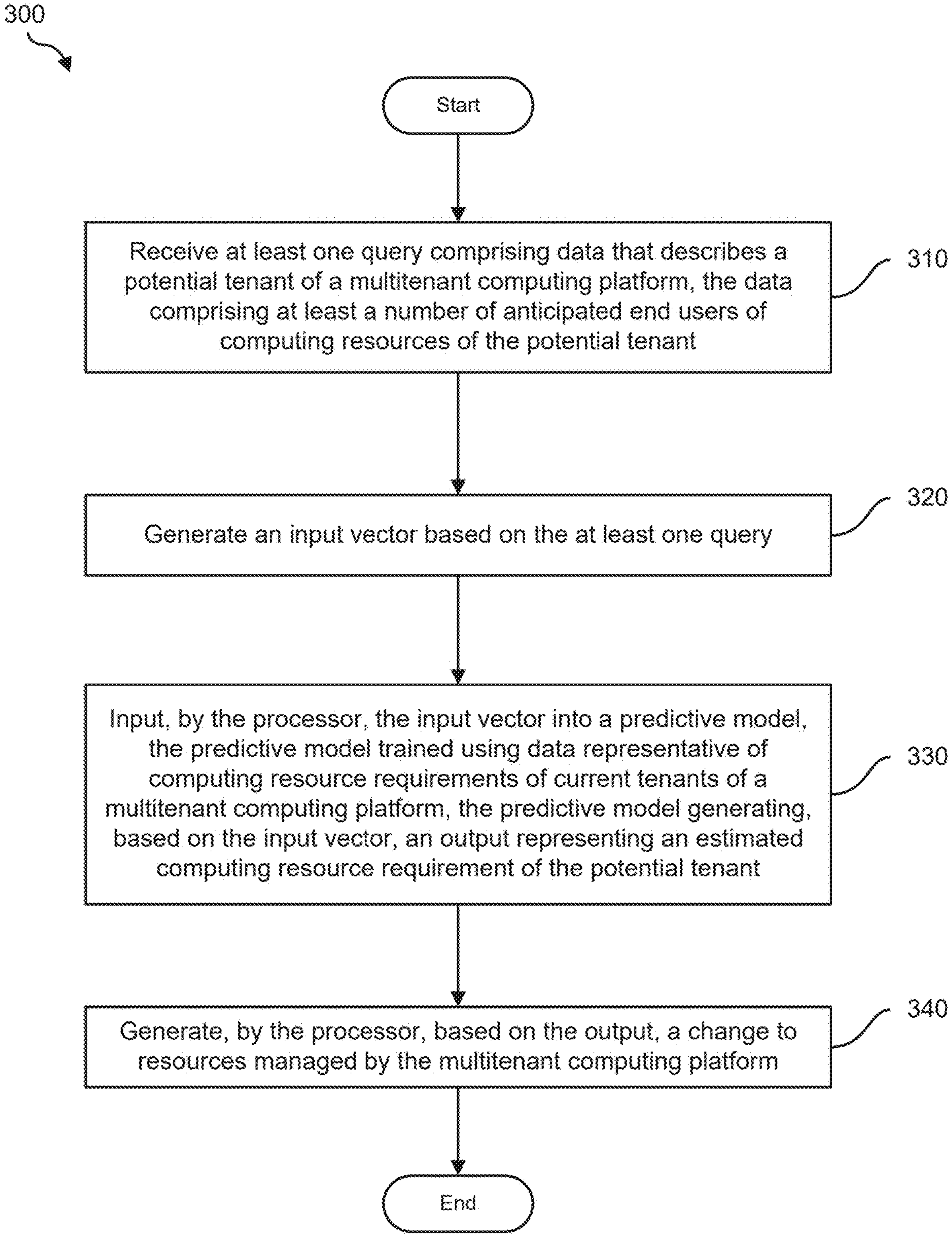
FIG. 3 is a flow diagram of an example computer-implemented method for AI-augmented capacity planning.

FIG. 3 is a flow diagram of an example computer-implemented method 300 for AI-augmented resource requirement estimation for potential tenants of a multitenant computing platform. The steps shown in FIG. 3 may be performed by any suitable computer-executable code and/or computing system, including one or more components of system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

At step 310, one or more of the systems described herein (e.g., the AI-augmented capacity planning system 106, via autonomous agent 202), may receive at least one query comprising data that describes a potential tenant of a multitenant computing platform. The data may include the number of anticipated end users of computing resources of the potential tenant. This query can be received via a user interface, such as the capacity planning interface 104. For instance, the autonomous agent 202 may receive, via capacity planning interface 104, a query about a potential tenant's number of employees, applications provided by the multitenant computing platform that the potential tenant may wish to use, estimated data storage requirements, computational power needs, bandwidth usage, and so forth.

Continuing with the above example, suppose that Company A is preparing to onboard a new tenant, a growing tech startup with 50 employees. The startup's representative provides some information about their expected needs, such as their number of employees, their area of business, applications provided by the multitenant computing platform they wish to use, and so forth. The autonomous agent 202 receives this data as a query and prepares to analyze it.

In some examples, before the autonomous agent 202 uses the predictive model to determine the output, it first validates the query it has received. In other words, autonomous agent 202 may check that the data about a potential tenant, like their number of employees, estimated data storage requirements, computational power needs, or bandwidth usage, etc. is accurate and complete. This step ensures that the predictive model is working with reliable and comprehensive information when it generates its output/inference, which in turn makes the output—the estimated computing resource requirements—more accurate and useful for Company A's capacity planning.

At step 320, one or more of the systems described herein may generate an input vector based on the received query. For example, the autonomous agent 202 may generate an input vector based on the received query. This input vector contains the necessary data to be input into the predictive model.

In the context of predictive models, an "input vector" may refer to a structured representation of raw data that is fed into a machine learning algorithm. It may essentially be a collection of numerical or categorical values that embody the features or characteristics of an entity or subject. Each element in the vector may correspond to a specific feature, and the value represents the magnitude or category of that feature. Machine learning models use these input vectors to make predictions or decisions. For example, in a predictive model for tenant computing resource requirements, an input vector might include values for features like the number of anticipated end users, estimated data storage requirements, software to be used, computational power needs, and bandwidth usage of the potential tenant.

Hence, autonomous agent 202 may generate an input vector by interpreting and/or converting the query from an original form to an input vector suitable to serve as an input into one or more predictive models (e.g., predictive model 204).

At step 330, one or more of the systems described herein (e.g., autonomous agent 202) may input the generated input vector into a predictive model (e.g., predictive model 204). The predictive model has been trained using input data representative of computing resource requirements of current tenants of a multitenant computing platform, and the predictive model may generate an output based on the input vector. This output may represent an estimated computing resource requirement of the potential tenant.

One or more of the systems described herein (e.g., autonomous agent 202) may configure or train predictive model 204 to infer computing resource requirements for potential tenants in a multitenant computing platform by reviewing and understanding input data about the computing resource needs of current users of the multitenant platform. Essentially, it may use this current and/or historic data (e.g., current tenant data 206 and/or historic tenant data 208) to learn about patterns and trends in resource usage among existing tenants.

In some examples, this input data may include each current tenant's computing resource needs, along with contextual information about each current tenant, such as information about their end user numbers (e.g., a total number of end users, a number of active end users, a number of independent end users, a number of terminated end users, and so forth). This additional data gives the predictive model a more detailed picture of each tenant, which can improve its predictions for potential tenants.

This data may be gathered in a variety of ways, from a variety of sources. For example, as will be described in greater detail below in reference to FIG. 4, training of the predictive model may be implemented and/or accomplished via a model training service. The model training service may collect data from multiple sources to create a comprehensive dataset for training its machine learning models.

One source may be a customer relationship management (CRM) system, which may provide tenant names, product areas, and industry information. Another source may be an operational database that stores current tenant sizing data, providing insights into the current distribution of resources among existing tenants. Another source may be a usage metrics system, which tracks active users, contingent workers, terminated workers, and overall system users. This data provides information about the human resources aspect of each tenant.

In some examples, another source may be an instance volume report, detailing the number of instances of a particular feature or aspect for each tenant. In additional or alternative examples, another source may be a task statistics system that provides data on total task duration and task duration for various types of tasks.

This collected data may then cleaned and transformed using data build tools to create a final dataset, which may be stored in a cloud storage service (e.g., Amazon S3, Microsoft Azure Blob Storage, etc.).

In some examples, the autonomous agent 202 may configure or train the predictive model by directing the predictive model to analyze additional or alternative input data associated with current tenants. This additional or alternative data may include each tenant's computing resource needs or allocations, how long they have been a tenant of the multitenant computing platform (i.e., their "age"), and the duration of tasks they've executed using the computing platform's resources. This additional information can help the predictive model "understand" how a tenant's resource needs might change over time and how different tasks might affect those needs.

By way of illustration, suppose that Company A's autonomous agent 202 is tasked with preparing predictive model 204 for a new round of capacity planning. Autonomous agent 202 may begin by accessing data from the company's current tenants, including their computing resource usage, the number of employees they have, the duration of tasks they execute using the platform, and other relevant data. Autonomous agent 202 may use this data to configure the predictive model, "teaching" it to understand patterns in resource usage based on these various factors. Autonomous agent 202 may then provide (e.g., make available and/or provide access to) the configured predictive model for further operations.

Continuing with the above example, the autonomous agent 202 may use the predictive model 204, now trained with the usage data of current tenants, to analyze the query. Based on the query that included information about the startup's size and industry, the predictive model predicts that the startup will require a certain amount of data storage, computational power, and bandwidth.

In some examples, one or more of the systems disclosed herein, such as autonomous agent 202, may carry out a series of operations involving querying multiple trained predictive models and aggregating their outputs. For instance, autonomous agent 202 may query different models (e.g., in addition to or as part of predictive model 204) for different types of resources, such as processing power, storage space, and networking bandwidth. Each of these models may be trained on distinct features, using different methodologies, and refreshed periodically (e.g., hourly, daily, monthly, etc.) with new or updated data, enabling them to provide alternative perspectives or supplementary information to an inference or output of predictive model 204.

The additional predictive models may utilize a variety of algorithms, such as Gradient Boost Classifier, to predict tenant resource usage. The chosen algorithms may vary depending on the targeted resource type, and may involve any approach including, but not limited to, regression and/or classification approaches. These models may be trained using diverse datasets, including data related to active employees, contingent workers, terminated workers, current and/or prospective tenant users, and more, which are collected from various sources like external sources (e.g., Salesforce), internal sources (e.g., databases, usage metrics, volume reports, etc.).

Autonomous agent 202 may then aggregate the inference or output produced by predictive model 204 with the outputs obtained from these additional machine learning models. This aggregation could involve various techniques, depending on the nature of the outputs and the desired format of the final result. In some examples, autonomous agent 202 may aggregate and/or consolidate all outputs into a resource manifest that provides a comprehensive view of the prospective tenant's resource requirements.

This resource manifest can then be used to automatically launch the appropriate cloud instances within a shared environment of the cloud service. This automation may allow for a more efficient allocation of resources, reducing the time and potential for error in manual provisioning.

The predictions and/or resultant cloud instances can be stored in a database (e.g., database 416, described below), to help in improving the algorithm for future use cases. The backend service may validate the input, query the different predictive models, and then aggregate the results from different models. This enables real-time, accurate capacity planning for new and existing tenants, reducing customer escalations, and saving costs.

Finally, the diverse training data used in the additional predictive models can provide unique insights that complement those of the predictive model, enhancing the accuracy and reliability of the final estimation. The continual refinement of the training data and the features used in the models, along with regular cross-validation, may help avoid overfitting and improve the accuracy of the predictions.

At step 340, one or more of the disclosed systems, such as autonomous agent 202, generates a change to resources managed by the multitenant computing platform based on the output. This change may be effected in a variety of ways. For example, autonomous agent 202 may provision computing resources to the potential tenant based on the output of the predictive model. In other words, the autonomous agent 202 may use the estimated computing resource requirements to allocate appropriate resources, such as storage, computational power, bandwidth, and so forth.

In some examples, the autonomous agent 202 may be configured to automatically provision these computing resources in response to the model's output. Through automation, the agent can streamline the onboarding process for new tenants, minimize the need for manual intervention, and ensure that resources are allocated precisely according to the predicted requirements.

The autonomous agent 202 may also have the capability to provision computing resources via different instances of the multitenant computing platform. Depending on the requirements and preferences of the potential tenant, resources can be provisioned via either a private instance or a shared instance of the platform. In a private instance, the tenant would have more control and customization, whereas a shared instance could be a cost-effective solution where resources are shared among multiple tenants. The decision between private and shared instances can be guided by the output of the predictive model, the prospective tenant's preferences, and other relevant factors.

In some examples, one or more of the systems described herein may further provide the estimated computing resource requirement of the potential tenant via a user interface. For example, the autonomous agent 202 may provide the estimated computing resource requirement via capacity planning interface 104. The estimated requirement may be communicated back to the user via capacity planning interface 104 and user device 102, enabling the user to make informed decisions about accommodating the potential tenant's needs. Continuing with the above example, autonomous agent 202 may prepare an output that includes estimated resource requirements, helping Company A plan and allocate the necessary resources for the startup's successful onboarding and operation.

In some examples, autonomous agent 202 may configure, train, re-configure, or re-train predictive model 204. For example, autonomous agent 202 may gather a data set associated with the current tenants of a multi-tenant cloud computing platform. For each existing tenant, the data set may incorporate their specific computing resource requirements. Subsequently, the autonomous agent 202 trains predictive model 204 based on the collected data set. This training procedure consists of several steps. First, the autonomous agent 202 may clean the data set, a process that removes any irrelevant or incorrect data that might distort the model's predictions.

Following the data cleaning, the autonomous agent 202 may transform the data set into a format that is processable by the predictive model. This transformation might involve translating the data into numerical values or organizing it into a particular structure.

Thereafter, the predictive model 204, under the control of the autonomous agent 202, may analyze the transformed data set. This analysis aligns with the training methodology of the predictive model, which could include a variety of machine learning techniques, depending on the specific type of predictive model in use.

Lastly, the predictive model is configured by the autonomous agent 202 by adjusting one or more parameters within the model. This could involve fine-tuning the weights or biases in a neural network, modifying the decision thresholds in a decision tree model, or making other alterations based on the outcomes of the data analysis.

In some implementations, the autonomous agent 202 may collect additional data about each current tenant's resource usage. This data may include the current computing resource requirement for each tenant and can also include various employee-related information for the tenant such as total employee count, the number of active employees, the number of independent employees, or the number of terminated employees. This additional information helps the predictive model to develop a more comprehensive understanding of the factors influencing each tenant's resource usage. Additionally or alternatively, this additional data could include the age of the tenant or the duration of specific tasks that the tenant has executed using the resources of the multi tenant computing platform.

Once the predictive model is trained, the autonomous agent 202 may fine-tune it by adjusting one or more of its hyperparameters. These are higher-level parameters that control the model's overall behavior, such as the maximum depth of the model's layers or the maximum number of features the model considers when making predictions.

To ensure the reliability and generalizability of the predictive model's predictions, the autonomous agent 202 may perform a cross-validation procedure. This may involve testing the model's predictions on a separate set of data that was not used during training. If the model's accuracy score surpasses a predetermined threshold value (e.g., 10%, 20%, 30%, 40%, 50%, 60%, 70%, 80%, 90%, etc.) the autonomous agent 202 takes additional measures to prevent overfitting, a common issue where a model becomes excessively complex and begins to 'memorize' the training data instead of 'learning' from it.

Finally, in some examples, the autonomous agent 202 may re-configure or re-train the predictive model using the estimated computing resource requirement of the potential tenant of the multi-tenant computing platform. This process allows the model to continuously improve and adapt based on new predictions, ensuring that it remains effective in predicting resource requirements for future tenants.

In addition to the foregoing, in some examples, the autonomous agent 202 of the AI-augmented capacity planning system 106 may execute additional operations related to an application programming interface (API). In some examples, autonomous agent 202 may expose an API that is specifically configured to provide inputs to the predictive model. This API acts as a conduit through which external systems or services can provide data to the predictive model, facilitating interaction with the model without directly accessing its underlying code or structures.

Further, in some embodiments, the autonomous agent 202 may receive queries associated with the prospective tenant of the multi-tenant computing platform via this API. As described above, these queries could contain potential tenant-specific data or requests for resource requirement predictions. By receiving these queries through the API, the autonomous agent 202 can ensure that the predictive model is supplied with the necessary input data to make accurate predictions for potential tenants.

Figure 4:
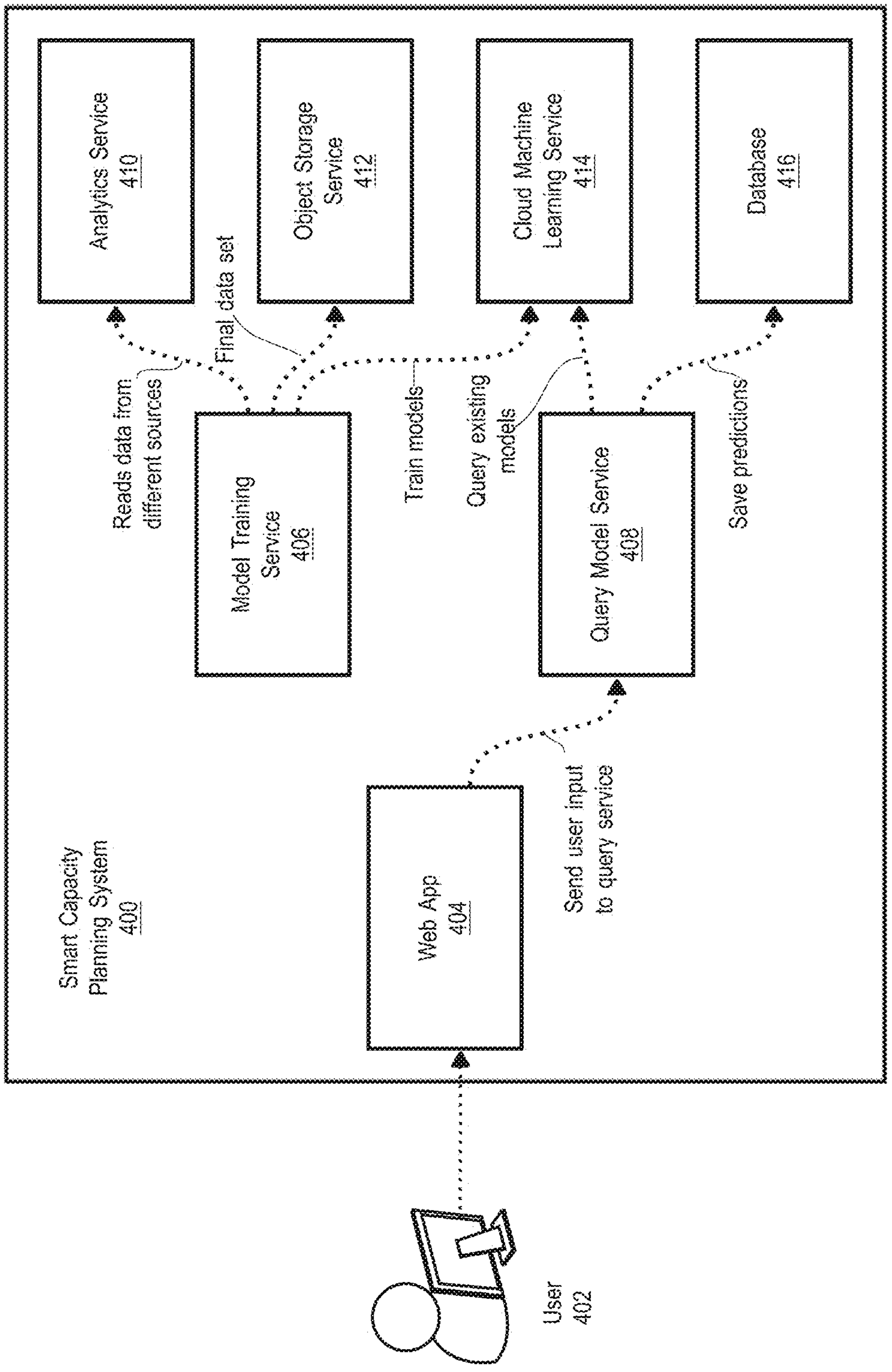
FIG. 4 illustrates an operational flow diagram that shows some elements and operations of an implementation of an AI-augmented capacity planning system.

Referring to FIG. 4, there is shown an operational flow diagram 400, which demonstrates some elements and operations of an implementation of an AI-augmented capacity planning system.

The operational flow diagram 400 includes a user 402 who interacts with a web application 404. User 402 may refer to or represent an individual or a system that interacts with the web application 404. The user 402 can input specific queries related to tenant capacity planning and receive predictions or inferences generated by the predictive models. Likewise, web application 404 represents a user interface that allows the user 402 to interact with the system. It receives queries from the user 402 and displays the results of the predictions or inferences made by the predictive models. Although described herein as a "web application", web application 404 may include or represent any suitable user interface implemented via any suitable hardware and/or software.

When the user 402 sends a query to the web application 404, the query is forwarded to a query model service 408. Query model service 408 may include or represent a component that handles queries from the web application 404. It uses the trained predictive models hosted on the cloud machine learning service 414 to generate predictions or inferences based on the received queries. The query model service 408 sends a query to existing models that are hosted by a cloud machine learning service 414.

The results obtained from the cloud machine learning service 414 are predictions or inferences which are saved in a database 416 by the query model service 408 and/or communicated back to user 402 via web application 404.

To train the models, model training service 406 reads data from different data sources aggregated and/or stored by an analytics service 410. Analytics service 410 aggregates data from various sources that are relevant to the capacity planning of a tenant. This may include, but is not limited to, tenant-specific data such as the tenant's name, product area, and industry, which could be obtained from outside data sources (e.g., Salesforce). It may also include resource usage data, which provides details about the current computing resource requirements of the tenants, such as the number of active employees, contingent workers, terminated workers, and users of computing services offered by the multitenant computing platform, sourced from usage metrics of the multitenant computing platform. In addition, the analytics service 410 may also aggregate other relevant data like the number of instances of software provided by the multitenant computing platform for each tenant from an instance volume report, and data like total task duration, user interface task duration, reports task duration, and the like from the multitenant computing platform. The analytics service 410 processes this aggregated data to create a clean and structured dataset that is used by the model training service 406 to train the predictive models.

The model training service 406 processes this data, which includes cleaning and aggregation, and sends the final dataset to an object storage service 412 for storage. The model training service 406 uses the cloud machine learning service 414 to train models, such as the predictive model 204. The training is based on the final dataset that was stored in the object storage service 412.

Cloud machine learning service 414 hosts the predictive models (e.g., predictive model 204) and provides machine learning capabilities. The model training service 406 uses this service to train predictive models, and the query model service 408 uses it to run queries against the trained models.

Database 416 is a storage component where the predictions or inferences made by the predictive models are saved. The query model service 408 uses this database to store the results of the queries made by the user 402, and model training service 406 may access database 416 to use predictions or inferences to train or re-train one or more predictive models.

This operational flow diagram 400 thus represents a continuous cycle of receiving user queries, querying existing models for predictions, saving these predictions, and retraining the models based on aggregated data. This implementation allows for dynamic updating and improvement of the predictive models based on continuous user interaction and data aggregation.

Figure 5:
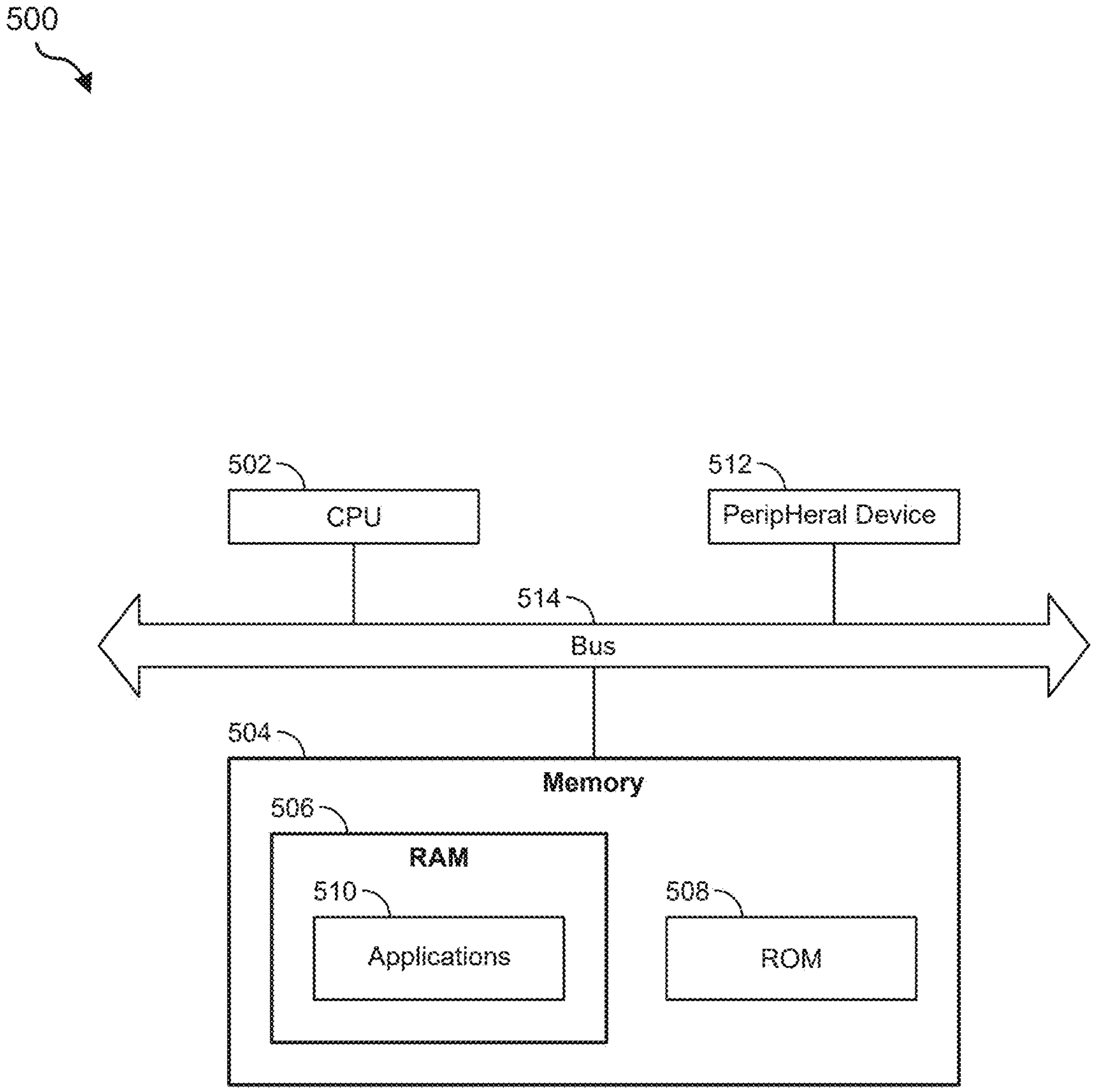
FIG. 5 is a block diagram of a computing device according to some embodiments of the disclosure.

FIG. 5 is a block diagram 500 of a computing device according to some embodiments of the disclosure.

As illustrated, the device includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Figure 6:
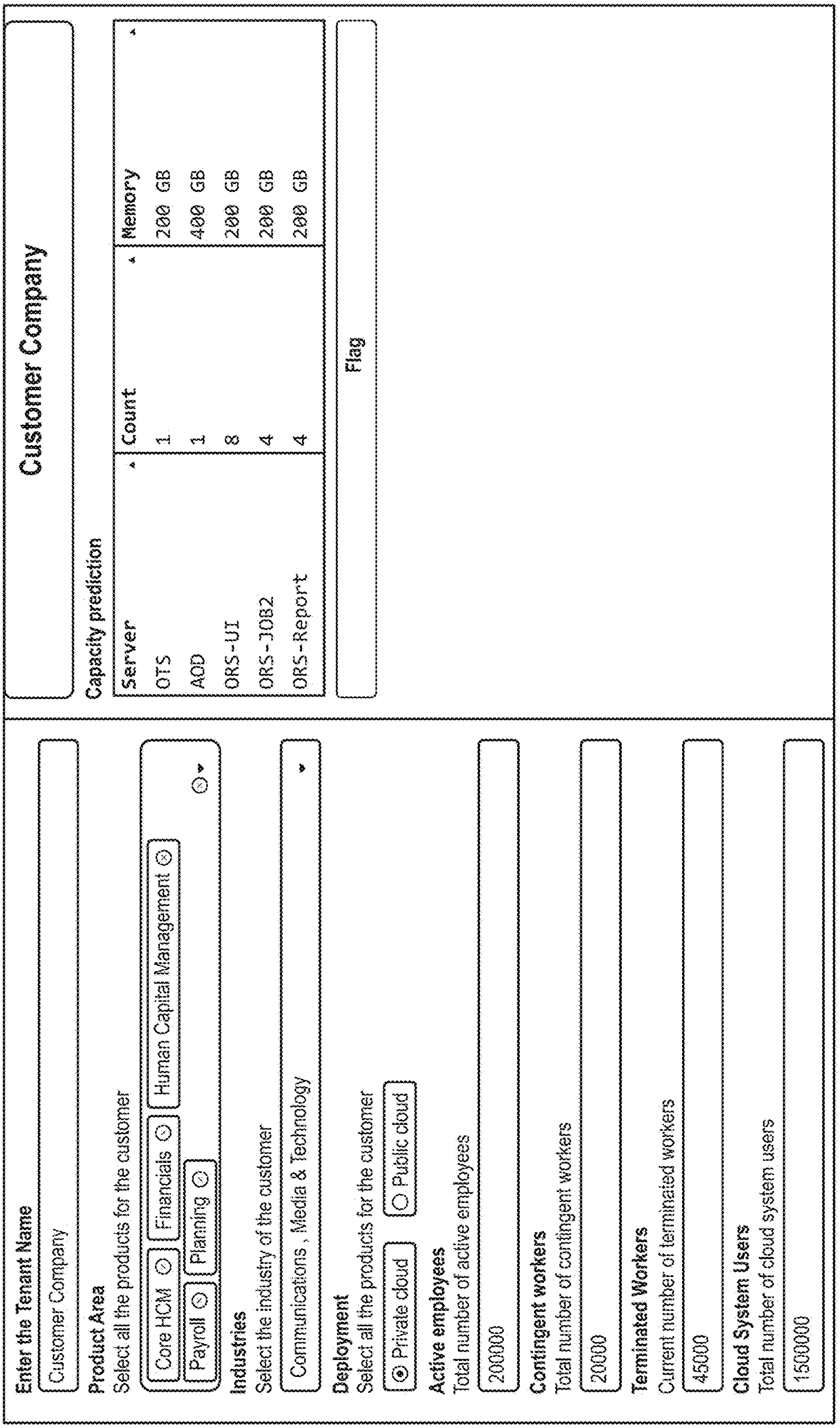
FIG. 6 illustrates an interactive user interface for an AI-augmented capacity planning system, designed to facilitate a range of capacity planning operations within an example organization's environment.

FIG. 6 illustrates an example user interface view 600 for an AI-augmented capacity planning system for a multitenant computing platform, according to at least one embodiment. In some examples, this user interface view 600 may be a view of an implementation of a web application, such as web application 404. This user interface is specifically designed for an AI-augmented capacity planning system, which automates and optimizes the capacity planning process for a multitenant computing platform.

In the top left section of FIG. 6, there is a section labeled "Enter the Tenant Name" where users, such as Performance Resiliency & Scalability (PRS) or Tenant Lifecycle Engineering (IPE-TLE) personnel, can input the name of the customer or tenant company utilizing the multitenant computing platform.

Directly below, there is a "Product Area" section where users can select the specific products (e.g., applications hosted and/or provided by the multitenant computing platform) that the customer has subscribed to. Example options shown include Core HCM, Financials, Human Capital Management, Payroll, and Planning.

Adjacent to the "Product Area" section is the "Industries" drop-down menu, where users can specify the industry of the customer, such as Communications, Media & Technology. This information provides additional context for the capacity planning predictions.

The "Deployment" section allows users to choose the deployment type for the products, either "Private cloud" or "Public cloud," which may affect the resource allocation and capacity requirements and/or provisioning actions.

The middle section of FIG. 6 displays fields related to the workforce of the tenant company. These include "Active employees," "Contingent workers," and "Terminated Workers," where users can enter the total number of active employees, contingent workers, and recently terminated workers, respectively. This workforce data may be helpful and/or may aid the machine learning model to make accurate capacity predictions.

At the bottom of FIG. 6 is a "Cloud System Users" field where the total number of users utilizing the cloud system is displayed. This information is sourced from the multitenant computing platform's usage metrics. Additionally, there is a "Flag" field that may be used to mark specific configurations or alerts related to capacity planning.

Finally, the right section of FIG. 6 presents a "Capacity prediction" area where the system displays predictive data related to server usage for the tenant. This includes a table listing server types (e.g., OTS, AOD, ORS-UT, ORS-JOB2, ORS-Report), the count of each server type utilized, and the memory allocation for each server type. This information is generated by the predictive model based on the input data and enables efficient management and prediction of capacity requirements.

This UI design, as depicted in FIG. 6, enables efficient management and prediction of server and system capacities within a multitenant computing environment. It leverages the power of AI to optimize resource allocation and operational planning, reducing toil and accelerating the tenant sizing process, and potentially resulting in significant cost savings for administrators of the multitenant computing platform.

In conclusion, the systems and methods disclosed in the present application provide a transformative approach to tenant capacity planning for multitenant computing platforms. The AI-augmented capacity planning system leverages machine learning models to automate and optimize the capacity planning process, thereby reducing manual effort, accelerating the tenant sizing process, and improving the accuracy of capacity predictions.

By training machine learning models on existing tenant usage data, the system can make accurate predictions for new deployments, subsequent deployments, upgrading deployments, and large volume events. This approach not only standardizes tenant sizing across all tenants but also reduces customer escalations. The financial implications are also significant, with the potential to avoid significant costs and a potential to improve margin data and deal margin.

A unique aspect of the system is the feedback loop incorporated into the model training process. The feedback from previous evaluations is used to feed better and more accurate data into the next training cycle, thereby improving the accuracy of the models to above 90%. This level of accuracy is rarely observed in real-life machine learning solutions.

Embodiments of the systems and methods described herein further serve multiple personas within organizations, including Performance Resiliency & Scalability (PRS) partners, Product Readiness Managers (PRM), Tenant Lifecycle Engineering (IPE-TLE), Financial Operations Teams, and Sales and Pricing Teams. The system benefits customers through faster deployments and improved accuracy of tenant capacity planning.

The system's user interface facilitates efficient management and prediction of server and system capacities, enabling users to input specific queries related to tenant capacity planning and receive predictions generated by the predictive models.

In summary, the disclosed systems and methods deliver a significant advancement in tenant capacity planning for multitenant computing platforms. By leveraging machine learning and artificial intelligence, the disclosed system and methods provide a more effective, efficient, and cost-saving solution, with implications for improved customer experience and organizational profitability.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

What is claimed is:

1. A method comprising:

receiving, by a processor, a query comprising data that describes a potential tenant of a multitenant computing platform, the data comprising a number of anticipated end users of computing resources of the potential tenant;

generating, by the processor, an input vector based on the query, the input vector comprising a plurality of features characterizing the potential tenant extracted from the data, the plurality of features including one or more of the number of anticipated end users, estimated data storage requirements, software to be used, computational power needs, and bandwidth usage of the potential tenant;

inputting, by the processor, the input vector into a predictive model trained using data representative of computing resource requirements of current tenants of the multitenant computing platform, the predictive model generating, based on the input vector, an output representing an estimated computing resource requirement of the potential tenant, the estimated computing resource requirement comprising processing resources, storage resources, and networking resources; and generating, by the processor, based on the output, a change to resources managed by the multitenant computing platform.

2. The method of claim 1, further comprising generating, by the processor, the change to resources managed by the multitenant computing platform by provisioning computing resources of the multitenant computing platform to the potential tenant based on the output.

3. The method of claim 1, further comprising generating, by the processor, the change to resources managed by the multitenant computing platform by automatically provisioning computing resources of the multitenant computing platform to the potential tenant in response to the output.

4. The method of claim 1, further comprising training, by the processor, the predictive model by directing the predictive model to analyze, in accordance with a training methodology of the predictive model, a set of input data associated with current tenants of the multitenant computing platform, the set of input data comprising, for each current tenant in a set of current tenants, a current computing resource allotment and at least one of:

a total end user amount associated with the current tenant;

an active end user amount associated with the current tenant;

an independent end user amount associated with the current tenant; or a terminated end user amount associated with the current tenant.

5. The method of claim 1, further comprising training, by the processor, the predictive model by directing the predictive model to analyze, in accordance with a training methodology of the predictive model, a set of training data associated with current tenants of the multitenant computing platform, the set of training data comprising, for each current tenant in a set of current tenants, a current computing resource allotment and at least one of:

an age of the current tenant; and at least one duration of at least one task initiated by the tenant and executed using computing resources of the multitenant computing platform.

6. The method of claim 1, further comprising:

inputting, by the processor, the input vector into at least one additional predictive model, the at least one additional predictive model generating at least one additional output; and aggregating the output of the predictive model with the at least one additional output to produce an aggregated output, the aggregated output representing the estimated computing resource requirement of the potential tenant.

7. The method of claim 1, further comprising validating by the processor, the query prior to generating, by the processor, the input vector based on the query.

8. A non-transitory computer-readable storage medium for tangibly storing computer program instructions capable of being executed by a computer processor, the computer program instructions defining steps of:

receiving, by the computer processor, a query comprising data that describes a potential tenant of a multitenant computing platform, the data comprising a number of anticipated end users of computing resources of the potential tenant;

generating, by the computer processor, an input vector based on the query, the input vector comprising a plurality of features characterizing the potential tenant extracted from the data, the plurality of features including one or more of the number of anticipated end users, estimated data storage requirements, software to be used, computational power needs, and bandwidth usage of the potential tenant;

inputting, by the computer processor, the input vector into a predictive model trained using data representative of computing resource requirements of current tenants of the multitenant computing platform, the predictive model generating, based on the input vector, an output representing an estimated computing resource requirement of the potential tenant, the estimated computing resource requirement comprising processing resources, storage resources, and networking resources; and generating, by the computer process, based on the output, a change to resources managed by the multitenant computing platform.

9. The non-transitory computer-readable storage medium of claim 8, the steps further comprising generating, by the processor, the change to resources managed by the multitenant computing platform by provisioning computing resources of the multitenant computing platform to the potential tenant based on the output.

10. The non-transitory computer-readable storage medium of claim 8, the steps further comprising generating, by the processor, the change to resources managed by the multitenant computing platform by automatically provisioning computing resources of the multitenant computing platform to the potential tenant in response to the output.

11. The non-transitory computer-readable storage medium of claim 8, the steps further comprising training, by the processor, the predictive model by directing the predictive model to analyze, in accordance with a training methodology of the predictive model, a set of input data associated with current tenants of the multitenant computing platform, the set of input data comprising, for each current tenant in a set of current tenants, a current computing resource allotment and at least one of:

a total end user amount associated with the current tenant;

an active end user amount associated with the current tenant;

an independent end user amount associated with the current tenant; or a terminated end user amount associated with the current tenant.

12. The non-transitory computer-readable storage medium of claim 8, the steps further comprising training, by the processor, the predictive model by directing the predictive model to analyze, in accordance with a training methodology of the predictive model, a set of training data associated with current tenants of the multitenant computing platform, the set of training data comprising, for each current tenant in a set of current tenants, a current computing resource allotment and at least one of:

an age of the current tenant; and at least one duration of at least one task initiated by the tenant and executed using computing resources of the multitenant computing platform.

13. The non-transitory computer-readable storage medium of claim 8, the steps further comprising:

inputting, by the processor, the input vector into at least one additional predictive model, the at least one additional predictive model generating at least one additional output; and aggregating the output of the predictive model with the at least one additional output to produce an aggregated output, the aggregated output representing the estimated computing resource requirement of the potential tenant.

14. The non-transitory computer-readable storage medium of claim 8, the steps further comprising validating by the processor, the query prior to generating, by the processor, the input vector based on the query.

15. A device comprising:

a processor;

a non-transitory computer-readable medium storing program instructions that, when executed by the processor, cause the processor to perform steps of:

receiving, by the processor, a query comprising data that describes a potential tenant of a multitenant computing platform, the data comprising a number of anticipated end users of computing resources of the potential tenant;

generating, by the processor, an input vector based on the query, the input vector comprising a plurality of features characterizing the potential tenant extracted from the data, the plurality of features including one or more of the number of anticipated end users, estimated data storage requirements, software to be used, computational power needs, and bandwidth usage of the potential tenant;

inputting, by the processor, the input vector into a predictive model trained using data representative of computing resource requirements of current tenants of the multitenant computing platform, the predictive model generating, based on the input vector, an output representing an estimated computing resource requirement of the potential tenant, the estimated computing resource requirement comprising processing resources, storage resources, and networking resources; and generating, by the process, based on the output, a change to resources managed by the multitenant computing platform.

16. The device of claim 15, the steps further comprising generating, by the processor, the change to resources managed by the multitenant computing platform by provisioning computing resources of the multitenant computing platform to the potential tenant based on the output.

17. The device of claim 15, the steps further comprising generating, by the processor, the change to resources managed by the multitenant computing platform by automatically provisioning computing resources of the multitenant computing platform to the potential tenant in response to the output.

18. The device of claim 15, the steps further comprising training, by the processor, the predictive model by directing the predictive model to analyze, in accordance with a training methodology of the predictive model, a set of input data associated with current tenants of the multitenant computing platform, the set of input data comprising, for each current tenant in a set of current tenants, a current computing resource allotment and at least one of:

a total end user amount associated with the current tenant;

an active end user amount associated with the current tenant;

an independent end user amount associated with the current tenant; or a terminated end user amount associated with the current tenant.

19. The device of claim 15, the steps further comprising:

inputting, by the processor, the input vector into at least one additional predictive model, the at least one additional predictive model generating at least one additional output; and aggregating the output of the predictive model with the at least one additional output to produce an aggregated output, the aggregated output representing the estimated computing resource requirement of the potential tenant.

20. The device of claim 15, the steps further comprising validating by the processor, the query prior to generating, by the processor, the input vector based on the query.

* * * * *